United States Patent [19]

Serini et al.

[11] 4,218,545
[45] Aug. 19, 1980

[54] THERMOPLASTIC RUBBER BLENDS OF POLYCARBONATES AND BLOCK COPOLYMERS

[75] Inventors: Volker Serini, Krefeld; Manfred Beck, Odenthal; Leo Morbitzer, Cologne; Gert Humme; Jochen Schnetger, both of Odenthal, all of Fed. Rep. of Germany

[73] Assignee: Bayer Aktiengesellschaft, Leverkusen, Fed. Rep. of Germany

[21] Appl. No.: 780,127

[22] Filed: Mar. 22, 1977

[30] Foreign Application Priority Data

Mar. 27, 1976 [DE] Fed. Rep. of Germany ....... 2613200
Sep. 29, 1976 [DE] Fed. Rep. of Germany ....... 2643757

[51] Int. Cl.² .............................................. C08L 53/00
[52] U.S. Cl. ................................................... 525/92
[58] Field of Search ............. 260/873, 47 XA; 525/92

[56] References Cited

U.S. PATENT DOCUMENTS

| 3,879,348 | 4/1975 | Serini et al. ..................... 260/47 XA |
| 3,966,842 | 6/1976 | Ludwig et al. ....................... 260/873 |
| 4,005,037 | 1/1977 | Metzsch et al. .................. 260/4 AR |
| 4,048,254 | 9/1977 | Hillier et al. ..................... 260/859 R |
| 4,080,356 | 3/1978 | Gergen et al. .................. 260/40 TN |
| 4,090,996 | 5/1978 | Gergen et al. ..................... 260/40 R |

Primary Examiner—Richard B. Turer
Attorney, Agent, or Firm—Connolly and Hutz

[57] ABSTRACT

Mixtures of (1) 99 to 1% of one or more segment copolymers of alternating linear or branched segments A and B wherein A are polymer blocks of aromatic vinyl compounds with $T_g > 20°$ C. (hard segment) and B are polymer blocks containing polymerized conjugated dienes with $T_g > 0°$ C. (soft segment), and (2) 1 to 99% of one or more aromatic polycarbonates in which the linear chains consist to an extent of at least 50% of structural units of the formula

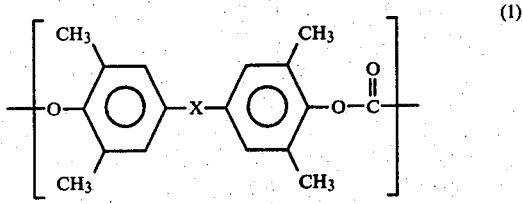

(1)

wherein X=$C_1$-$C_5$ alkylene or alkylidene.

9 Claims, No Drawings

THERMOPLASTIC RUBBER BLENDS OF POLYCARBONATES AND BLOCK COPOLYMERS

Linear or branched segment copolymers constructed of alternating segments A and B wherein A are polymer blocks of aromatic vinyl compounds and B are polymer blocks of conjugated dienes or blocks of statistical copolymers of dienes with aromatic vinyl compounds are already known (segment polymers). They have thermoelastic properties, i.e. they can be moulded thermoplastically when heated, and at room temperature they are elastomers. Their disadvantages include inferior performance at elevated temperatures, poor stability to ozone, in many cases insufficient abrasion stability and insufficient tear propagation resistance. For a number of purposes it is advantageous to hydrogenate part or all of the aliphatic double bonds, respectively of the aromatic double bonds in the benzene nuclei.

On the other hand, polycarbonates of o,o,o',o'-tetramethylsubstituted bisphenols are known which have excellent dimensional stability under heat and stability to saponification but have insufficient toughness for many purposes.

It has now been found that thermoplastic rubbers having improved properties are obtained by mixing the above mentioned polycarbonates with such segment polymers. Thus, for example, the performance at elevated temperatures as characterised, for example, by measurements of the ultimate tensile strength and elongation as well as the abrasion stability, tear propagation resistance and stability to ozone and oxygen are improved.

It was also found that, conversely, the toughness and processing characteristics of polycarbonates are improved by the addition of segment polymers. When such segment polymers are added, the transparency of the polycarbonate may be preserved without recourse to special measures. One remarkable feature of these mixtures is their stability to discoloration and degradation during processing in spite of the presence of alkali. The tracking resistance or resistance to surface leakage may also be improved in such mixtures.

Accordingly the present invention provides mixtures of:

(1) from 99 to 1% of one or more segment copolymers including partly or totally hydrogenated segment copolymers of alternating, linear or branched, segments A and B wherein A are polymer blocks of aromatic vinyl compounds with $T_g > 20°$ C. (hard segment) and B are polymer blocks containing polymerised conjugated dienes with $T_g < 0°$ C. (soft segment), and from 1 to 99% of one or more aromatic polycarbonates in which the linear chains consist to an extent of at least 50% of structural units of the formula (I):

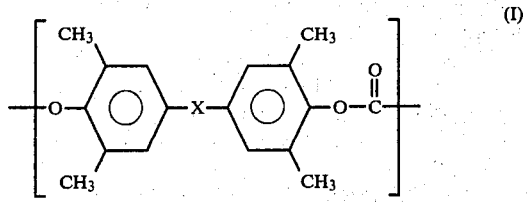

wherein $X = C_1-C_5$ alkylene or alkylidene.

Aromatic polycarbonates whose linear chains consist to an extent of at least 50% of structural units of the formula

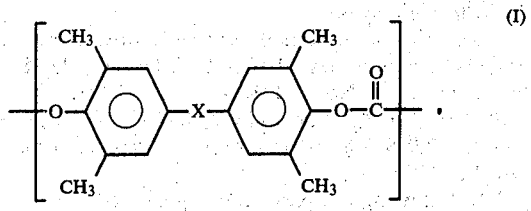

wherein $X = C_1-C_5$ alkylene or alkylidene are already known. They have been described in German Offenlegungsschriften No. 2,063,050, No. 1,570,703, No. 2,211,957 and No. 2,248,817. Generally, they are prepared in known manner.

By adding bisphenols, which are not o,o,o',o'-bisphenols of the formula

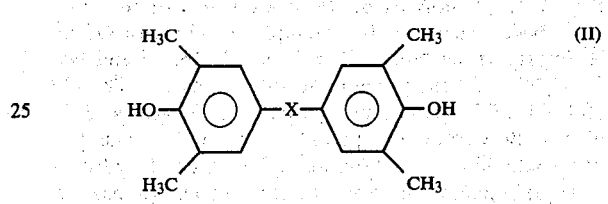

wherein X is defined as above. Up to 50% by weight of the bisphenol of formula (II) can be replaced by a different bisphenol. Mixtures of polycarbonates having structural units (I) and up to 50% by weight of other aromatic polycarbonates can also be used.

Also any mixture of aromatic polycarbonates can be used provided its content in structures of formula (I) is 50% or more.

Polycarbonates in which at least 75% of the linear chains consist of structural units of the formula (I) are preferred. Those which consist entirely of structural units of the formula (I) are particularly preferred.

The polycarbonate units of the formula (I) may be based, for example, on the following o,o,o',o'-tetramethyl substituted bis-phenols:

Bis-(3,5-dimethyl-4-hydroxyphenyl)-methane;
1,1-bis-(3,5-dimethyl-4-hydroxyphenyl)-ethane;
1,1-bis-(3,5-dimethyl-4-hydroxyphenyl)-propane;
2,2-bis-(3,5-dimethyl-4-hydroxyphenyl)-propane;
2,2-bis-(3,5-dimethyl-4-hydroxyphenyl)-butane;
2,4-bis-(3,5-dimethyl-4-hydroxyphenyl)-butane;
2,4-bis-(3,5-dimethyl-4-hydroxyphenyl)-2-methylbutane; and
3,3-bis-(3,5-dimethyl-4-hydroxyphenyl)-pentane.

Particularly preferred among these bis-phenols is 2,2-bis(3,5-dimethyl-4-hydroxyphenyl)-propane.

The following are examples of bis-phenols which do not correspond to Formula (II) and which are suitable for the preparation of "mixed" polycarbonates or for the preparation of polycarbonates composed of units other than those of Formula (II):
Hydroquinone;
resorcinol;
dihydroxydiphenyls;
bis-(hydroxyphenyl)-alkanes;
bis-(hydroxyphenyl)-cycloalkanes;
bis-(hydroxyphenyl)-sulphides;
bis-(hydroxyphenyl)-ethers;
bis-(hydroxyphenyl)-ketones;

bis-(hydroxyphenyl)-sulphoxides;
bis-(hydroxyphenyl)-sulphones;
α, α'-bis-(hydroxyphenyl)-diisopropylbenzenes;
and derivatives thereof which are alkylated or halogenated in the nucleus.

These and other suitable aromatic dihydroxy compounds have been described in U.S. Pat. No. 3,028,365, No. 2,999,835, No. 3,148,172, No. 3,271,368, No. 2,991,273, No. 3,271,367, No. 3,780,078, No. 3,014,891 and No. 2,999,846 and in German Offenlegungsschrift No. 1,570,703.

The following are particularly preferred;
2,2-Bis-(4-hydroxyphenyl)-propane;
1,1-bis-(4-hydroxyphenyl)-cyclohexane;
2,2-bis-(3,5-dichloro-4-hydroxyphenyl)-propane;
2,2-bis-(3,5-dibromo-4-hydroxyphenyl)-propane; and
α, α'-bis-(4-hydroxyphenyl)-p-diisopropylbenzene.

The polycarbonates may be branched by the incorporation of small quantities of polyhydroxy compounds, e.g. from 0.05 to 2.0 mol % thereof, (based on the quantity of bis-phenols used). Polycarbonates of this kind have been described, for example, in German Offenlegungsschriften No. 1,570,533, No. 2,116,974 and No. 2,113,347, in British patent specifications No. 885,442 and No. 1,079,821 and in U.S. Pat. No. 3,544,514. Suitable polyhydroxy compounds include, for example, phloroglucinol, 4,6-dimethyl-2,4,6-tri-(4-hydroxyphenyl)-heptane, 1,3,5-tri-(4-hydroxyphenyl)-benzene, 1,1,1-tri-(4-hydroxyphenyl)-ethane, tri-(4-hydroxyphenyl)phenylmethane, 2,2-bis-[4,4-(4,4'-di-hydroxydiphenyl)-cyclohexyl]-propane, 2,4-bis-)4-hydroxyphenyl-4-isopropyl)-phenol, 2,6-bis-(2'-hydroxy-5'-methyl-benzyl)-4-methyl-phenol, 2,4-dihydroxybenzoic acid, 2-(4-hydroxyphenyl)-2-(2,4-dihydroxyphenyl)-propane and 1,4-bis-(4', 4''-dihydroxy-triphenyl-methyl)-benzene.

The polycarbonates in most cases have molecular weights $M_w$ in the range of from 10,000 to 200,000 preferably in the range of from 15,000 to 60,000, most preferably 15,000 to 60,000.

The segment copolymers required for preparation of the polymer mixtures can be prepared by various known processes. According to German Offenlegungsschrift No. 1,940,278, for example, living block copolymers of the type A-B$^\ominus$-Li$^\oplus$can be converted into A-B'-A type segment polymers by coupling with carboxylic acid esters. In these segment polymers, A is a polystyrene block, B a polydiene block and Li represents lithium, and B' has twice the molecular weight of B. German Offenlegungsschrift No. 1,645,298 describes a three-stage process in which styrene is first polymerised with lithium alkyl to form a living polystyrene block to which butadiene is then added and after polymerisation of the butadiene, styrene is again added so that a segment polymer having the structure A-B-A results. Multiple segment products can be obtained by repetition of the monomer addition. According to German Auslegeschrift No. 1,520,543, living diblock polymers of the structure A-B-Li are coupled with polyfunctional linking agents such as polyepoxides or polyaziridinyl compounds to form segment polymers having the structure $(A-B)_nK$, wherein K denotes the linking agent radical and n its functionality. According to German Auslegeschrift No. 1,905,422, living "diblock" polymers can be coupled with diesters. Furthermore, segment polymers can be prepared from polyfunctional lithium compounds. These lithium compounds can be obtained, for example, by reacting metallic lithium with naphthalene and then reacting the resulting product with sytrene. Polylithium compounds prepared from lithium alkyl and divinylbenzene are known which may carry up to 50 functional groups. Suitably controlled reaction of such polyfunctional lithium compounds leads to stellate segment polymers. According to German Offenlegungsschrift No. 2,504,118, segment polymers are prepared by the stepwise addition of (a) styrene, (b) a styrene/diene mixture and (c) further styrene in the presence of lithium alkyl and a polar compound, the middle block forming an elastomeric statistical copolymer of diene and styrene. Also useful are segment polymers which are made by linking block polymers with peroxides (cf. DT-OS 2 457 389; U.S. Pat. No. 3,819,766) as well as with sulfur halides (cf. DT-OS 2 457 388). Further stellate type segment copolymers are disclosed in DT-OS 2 529 065 and 2 535 801.

The following aromatic vinyl monomers may be used for preparing the hard segments A or can be copolymerised statistically into segments B: Styrene, vinyl naphthalene, vinylpyridine, α-methyl styrene and alkyl styrenes. Styrene is preferably used. The monomers used for preparing the elastomeric segments are conjugated dienes such as 1,3-butadiene, 2,3-dimethylbutadien, isoprene or piperylene. For preparing elastomeric segments which exist as statistical copolymers, styrene in particular may be used as a comonomer in addition to butadiene and isoprene.

The molecular weight of the hard segments A may be between 5000 and 250,000, preferably between 10,000 and 50,000, and the molecular weight of the elastomeric soft segments between 10,000 and 500,000, preferably between 20,000 and 80,000.

Hydrogenation of the segment polymers is known in the art according to several methods. For example, catalytic hydrogenation with hydrogen with Raney-Nickel is suitable; other catalysts are Cobalt or Nickel salts together with aluminum alkyls, or noble metal salts such as rhodium halides. Hydrogenation can be complete or partial depending on requirements as to stability against ozone of the segment copolymer.

The percentage proportion of the hard components in the segment polymers depends on the desired properties of the polymeric mixture of polycarbonate and segment polymer.

According to one embodiment of the invention, preferred thermoplastic rubbers consist of 2 to 50% by weight, most preferably 10 to 35% by weight of the polycarbonate and preferably 98 to 50% by weight, most preferably 90 to 65% by weight, of the segment polymer. The segment polymer itself contains from 10 to 60% by weight and preferably 20 to 50% by weight of hard segments and from 90 to 40%, preferably 80 to 50% by weight of soft segments.

According to another embodiment of the invention the improved polycarbonates consist preferably of from 10 to 90% by weight and most preferably 15 to 80% by weight of segment polymer and preferably from 90 to 10% by weight and most preferably 85 to 20% by weight of the polycarbonate.

The segment polymer itself preferably contains from 10 to 90% by weight and most preferably 30 to 80% by weight of hard segments and, correspondingly, from 90 to 10% by weight, respectively 70 to 20% by weight of soft segments.

The polycarbonate/segment polymeric mixtures may be prepared by adding solutions of the individual components together or by combining the pure components.

The polymeric mixture can be isolated from the combined solutions by a stripping process consisting of simultaneously introducing the solution and steam into hot water. The polymer is thereby precipitated in a crumbly form and after removal of the water it can be isolated by known methods, e.g. by drying in a vacuum oven or a drying screw or on band driers. The polymer may also be isolated from the solution by directly evaporating off the solvent in evaporator screws. Mixtures without solvent can be prepared at elevated temperatures in suitable apparatus such as roll mills or kneaders.

The mixtures prepared according to the invention may be modified by means of conventional additives, e.g., by the addition of polystyrenes, shock-resistant polystyrenes, ethylene-vinylacetate copolymers, polyolefins, chlorinated polyolefins, general purpose rubbers, polymethylmethacrylate or styrene/acrylonitrile copolymers. Fillers such as silicates and other minerals of various origin, sawdust, carbon black or glass fibres or other elements to produce decorative effects, dyes, pigments, stabilizers against heat, oxidation and UV radiation and other stabilizers, plasticizers, lubricants, mould release agents, flame retarding agents such as halogenated organic compounds, metal oxides, metal salts and organic phosphates may also be used as additives.

The mixtures can also be made softer by the addition of oils. Aliphatic, naphthenic or aromatic oils may be used for this purpose. Polyolefine oils and polydiolefine oils may be added and higher boiling aliphatic, aralipathic and aromatic esters may also be used.

The mixtures may be stabilized with the aid of the usual rubber stabilizers such as alkylated mononuclear or polynuclear phenols or thioethers of alkylated phenols. Synergistically acting compounds such as thio-bis-alkane acid esters and alkyl phenyl phosphites may also be added.

Polymeric mixtures containing a predominant proportion of soft segment B may be used for the manufacture of commercial rubber goods such as shoe soles, hose pipes and seals. Those mixtures which contain a predominant proportion of hard component A and polycarbonate are suitable for the manufacture of moulded articles which are required to be resistant to saponification and have a high impact strength and heat distortion temperature, for example, as pipes, housing elements and containers.

EXAMPLE 1

35 g of destabilized and anhydrous styrene were added to 780 ml of anhydrous toluene under a nitrogen atmosphere. 1.6 mMol of n-butyl lithium were added at 35° C. 100 g of liquid butadiene were added after one hour at 35° to 45° C. and polymerised for 2 hours at 55° C. Another 35 g of styrene was then added and the mixture was polymerised for one hour before a small quantity of methanol was added to stop polymerisation and 0.5 g of di-tertiary butyl-methyl phenol as stabilizer. 100% conversion was achieved. To one half of the solution was added a solution in toluene of 29.8 of tetramethyl bis-phenol A-polycarbonate (MPC, 2.2-Bis-(3.5-dimethyl-4-hydroxyphenyl)propan=Tetramethyl-bisphenol A) $\eta_{rel}$=1.30 (determined in a solution of 0.5 g in 100 ml of methylene chloride at 25° C.). The polymer was isolated from both solutions by precipitation with ethyl alcohol. The products were pressed at 150° C. to form plates and their mechanical properties were determined.

|  | Without MPC | With MPC |
|---|---|---|
| F (MPa) | 11.1 | 15.0 |
| D (%) | 1110 | 490 |
| M 300/500% | 1.8/2.6 | 9.4/15.0 |
| H |  |  |
| 23° | 76 | 85 |
| 70° | 64 | 77 |
| 100° | 39 | 69 |
| 120° | 21 | 63 |
| 150° | 11 | 50 |
| E 25/70° | 51/40 | 50/46 |
| Str. (N) | 125 | 155 |
| F(80°) (MPa) | 1.2 | 5.7 |
| D(80°) (%) | 440 | 490 |

Abbreviations:
F = strength, D = elongation, M = modulus,
H = Shore A hardness, E = recoil elasticity,
Str. = tear propagation resistance (structure),
F(80°) or D(80°) = strength or elongation at 80° C. The values were determined on a standard ring I DIN 53 504.

EXAMPLE 2

121 g of styrene were added to 1050 ml of toluene and the mixture was polymerised with 6.06 mMol of secondary butyl lithium. 182 g of butadiene were added and the mixture was left to react for 2 hours at 50° to 55° C. 3.3 mMol of butyl acetate were added for coupling the diblocks. 0.5 phr of di-tert.-butyl-4-methylphenol were added after 30 minutes. The resulting polymeric solution was combined with a 20% solution of 91 g of MPC (for abbreviations see Example 1) in toluene and the product was precipitated with ethanol. 392 g of polymer were obtained after drying under vacuum. The mechanical properties were as follows:

| F | D | M(300/500%) | H 23/70/100/120/150° | E | Str. | F 80° | D 80° |
|---|---|---|---|---|---|---|---|
| 18.5 | 540 | 11.6/17.2 | 95/91/71/51/26 | 45/35 | 260 | 6.3 | 390 |

EXAMPLE 3

364 g of styrene were added to 3760 ml of toluene and the mixture was activated with 24.3 mMol of lithium butyl. 728 g of butadiene were added after 60 minutes at 45° C. and the resulting mixture was polymerised at 55° to 60° C. for 2 hours. 20 mMol of diethyl carbonate were then added and the mixture was left to react at room temperature for 30 minutes. 0.5 phr of di-tert.-butyl-4-methylphenol was added and the solution was then divided into four equal parts. To these parts were added (A) 45.6 g, (B) 68.4 g, (C) 91 g and (D) 113.4 g of MPC dissolved in toluene. The product was isolated from the solutions by precipitation with ethanol. When it has been dried under vacuum it was pressed to form plates on which the mechanical properties were determined.

|   | A | B | C | D |
|---|---|---|---|---|
| F | 15.1 | 16.8 | 18.0 | 19.3 |
| D | 570 | 515 | 400 | 360 |
| M(300/500%) | 7.0/12.2 | 9.9/16.0 | 14.2/— | 16.9/— |
| H 23° | 85 | 88 | 93 | 92 |
| H 70° | 75 | 80 | 86 | 86 |
| H 100° | 55 | 63 | 75 | 75 |
| H 120° | 37 | 50 | 61 | 63 |
| H 150° | 15 | 27 | 38 | 42 |
| E(23/70°) | 50/40 | 52/46 | 47/42 | 49/75 |
| Str. | 130 | 165 | 205 | 200 |
| F(80°) | 4.0 | 5.4 | 8.9 | 7.7 |
| D(80°) | 525 | 485 | 445 | 340 |
| M(300%,80°) | 3.6 | 4.8 | 7.4 | 7.7 |

The products are distinguished by high strengths and moduli at room temperature and 80° C. combined with normal elongations and elasticity values.

EXAMPLE 4

242 g of styrene were added to 2520 ml of toluene and the mixture was polymerised with 12.1 mMol of n-butyl lithium in a manner analogous to that described in Example 3. 484 g of butadiene were then added. After termination of the polymerisation reaction, half the solution was discharged and stopped with 5 ml of methanol. 6 mMol of dimethyl carbonate were added to the still active solution which was then left to react for a further 30 minutes at room temperature, and 100 g of tetramethyl bis-phenol-A polycarbonate (MPC) were then added to both solutions. After stabilisation, the product was precipitated from the solutions and dried under vacuum at 70° C. The mechanical properties of the products of diblock (A) were found to be considerably inferior to those obtained with the coupled segment polymers (B):

|   | A | B |
|---|---|---|
| F | 2.2 | 15.8 |
| D | 140 | 345 |
| M | —/— | 14.4/— |
| H 23° | 74 | 93 |
| H 70° | 53 | 89 |
| H 100° | 31 | 75 |
| H 120° | 17 | 56 |
| H 150° | 0 | 37 |
| E (23°/70°) | 41/26 | 48/42 |
| Str. | 60 | 210 |
| F(80°) | 0.8 | 7.3 |

EXAMPLE 5 to 1000 g of a butadiene/styrene segment polymer (commercial name Cariflex TR 4122) were added (A) 200 g of MPC, (B) 300 g of MPC and (C) 200 g of polystyrene 165 H (BASF) in solution. The products were isolated by running the solutions into hot water with the simultaneous flowing through the steam. When the crumbly product had been dried, the mechanical properties were determined and the following results were obtained:

|   | A | B | C | D |
|---|---|---|---|---|
| Additive | MPC 200 g | MPC 300 g | PS 200 g | none |
| F | 10.3 | 10.5 | 9.1 | 6.5 |
| D | 570 | 295 | 805 | 900 |
| M | 7.1/9.6 | 10.0/— | 3.5/6.1 | 3.3/4.2 |
| H 23° | 94 | 96 | 77 | 77 |
| H 70° | 85 | 90 | 56 | 52 |
| H 100° | 57 | 69 | 6 | 5 |
| H 120° | 18 | 32 | 0 | 3 |
| H 150° | 0 | 2 | 0 | 0 |
| E (23°/70°) | 40/32 | 43/35 | 33/30 | 39/35 |
| Str. | 200 | 215 | 110 | 86 |
| F(80°) | 2.7 | 4.1 | 0.6 | 0.3 |
| D(80°) | 205 | 245 | 365 | 100 |

The mixture containing MPC is substantially more transparent than the mixture containing polystyrene. A printed text can easily be read through a 3 mm thick plate of product (A) but not through a similar plate of product (C).

EXAMPLE 6

This example demonstrates the surprising improvement in properties obtained in MPC mixtures compared with the properties found in a non-methyl substituted polycarbonate of bisphenol-A (Makrolon 2800=PC). To a styrene/butadiene segment polymer prepared by coupling a living S/B diblock (molecular weight 12,600/20,000) with diethyl carbonate (Sample A) was added the quantity of PC (Sample B) or MPC (Sample C) required to provide a segment polymer:polycarbonate ratio of 80:20. Mechanical tests carried out on the samples show that MPC mixtures are superior to PC mixtures in their strength, modulus, elasticity and particularly Shore hardness at elevated temperatures as well as in their tear propagation resistance (Str.). Only the product containing MPC still has superior strength properties at 80° C.

|   | A | B | C |
|---|---|---|---|
| Additive | none | PC | MPC |
| F | 15.7 | 10.7 | 14.1 |
| D | 840 | 810 | 465 |
| M | 4.0/6.3 | 5.5/6.7 | 10.4/— |
| H 23° | 91 | 91 | 94 |
| H 70° | 79 | 80 | 93 |
| H 100° | 24 | 9 | 78 |
| H 120° | 8 | 7 | 56 |
| H 150° | 0 | 0 | 8 |
| E 23/70° | 47/38 | 45/36 | 48/40 |
| Str. | 150 | 140 | 225 |
| F 80° | 0.3 | 0.4 | 7.4 |

EXAMPLE 7

This example demonstrates the effect of MPC compared with that of polystyrene as a constituent of the polymeric mixture. A styrene/butadiene diblock (molecular weight 20,000/30,000) was coupled in a manner analogous to Example 3. 15 phr of an extender oil (Gulf Oil 2212) were than added. The solution was halved and to each half were added 20 phr of polystyrene BASF 165 H(Sample A) and 20 phr of tetramethyl bisphenol-A-polycarbonate ($\eta_{rel}=1.30$). When the products had been isolated by stripping with steam and drying, they were found to have the following mechanical properties:

|   | A | B |
|---|---|---|
| F | 12.0 | 15.0 |
| D | 740 | 615 |
| M 300/500 | 4.7/7.9 | 5.9/11.0 |
| H 23° | 82 | 92 |

-continued

|  | A | B |
| --- | --- | --- |
| H 70° | 72 | 84 |
| H 100° | 39 | 68 |
| H 120° | 16 | 46 |
| H 150° | 3 | 14 |
| E 23/70° | 41/36 | 45/37 |
| Str. | 120 | 190 |
| F 80° | 2.8 | 6.5 |
| D 80° | 590 | 640 |

The improvement in properties obtained by the addition of MPC compared with the improvement obtained with polystyrene is clearly seen in all the measurements carried out.

EXAMPLE 8

To a segment prepared in analogous manner to that of of Example 3 (having molecular weight of diblock 20,000/20,000 PS/PBD) were added in solution, respectively, 10, 20, 30, 100 and 200 phr of MPC. The products were found to have the following mechanical properties:

|  | A | B | C | D | E |
| --- | --- | --- | --- | --- | --- |
| MPC | 10 phr | 20 phr | 30 phr | 100 phr | 200 phr |
| F | 17.5 | 18.7 | 19.1 | 23.0 | 35.0 |
| D | 595 | 555 | 470 | 100 | 20 |
| M | 7.2/12.9 | 10.1/16.8 | 14.1/— |  |  |
| H 23° | 90 | 94 | 97 | 98 | 98 |
| H 70° | 90 | 94 | 95 | 96 | 96 |
| H 100° | 79 | 69 | 74 | 80 | 85 |
| H 120° | 37 | 41 | 54 |  |  |
| H 150° | 8 | 15 | 14 |  |  |
| E 23/70° | 50/38 | 44/33 | 44/36 |  |  |
| Str. | 410 | 250 | 395 |  |  |
| F 80° | 10.0 | 7.6 | 8.0 | 19.0 | 23.0 |
| D 80° | 800 | 540 | 485 | 160 | 25 |

EXAMPLE 9

50 Parts of a triblock copolymer having the structure S-B-S and segment molecular weights of 15,000 for styrene and 60,000 for butadiene were mixed with 50 parts of tetramethyl bis-phenol-A-polycarbonate ($\eta_{rel}$=1.30 measured in a solution of 0.5 g in 100 ml of methylene chloride at 25° C.) in a roll mill at 260° C. The resulting mass was granulated and extruded to form test samples. For comparison, analogous test samples were produced from the same polycarbonate without the addition of block polymer. The table shows the notched impact strength of the mixture over a wide temperature range. The figures obtained are excellent and substantially superior to those of the polycarbonate.

| $a_K$[1] | RT | 0° | −40° C. |
| --- | --- | --- | --- |
| MPC | 4 | 4 | 3 cmkp/cm$^2$ |
| Mixture | 15 | 15 | 13 |

[1]Notched impact strength according to DIN 53 453)

EXAMPLE 10

A mixture of 35 parts of segment polymer and 65 parts of MPC ($\eta_{rel}$=1.30) was prepared according to Example 9. This product also shows improved notched impact strength:

| $a_K$[1] | 25° | 0° | −40° C. |
| --- | --- | --- | --- |
| MPC | 4 | 4 | 3 cmkp/cm$^2$ |
| Mixture | 12 | 12 | 10 |

[1]Notched impact strength according to DIN 53 453

EXAMPLE 11

364 g of styrene were dissolved in 5000 ml of anhydrous toluene. The solution was activated with 36.4 mMol of lithium butyl. 1092 g of butadiene were added after 2 hours at 50° C. and the mixture was polymerised for a further 2 hours at 55° C. 36.4 mMol of diethyl carbonate were then added and the mixture was left to react for 30 minutes before 0.5 phr of a phenolic antioxidant was added. The reaction mixture was divided into three equal parts and to each part was added the given quantity of tetramethyl bisphenol-A-polycarbonate ($\eta_{rel}$=1.30) in the form of a solution in toluene. A: 18.8 phr (92 g), B: 25 phr (121 g), C: 31.2 phr (151 g). The rubber was then isolated by precipitation, dried and shaped into test samples.

|  | A | B | C |
| --- | --- | --- | --- |
| F | 14.0 | 14.5 | 14.3 |
| D | 740 | 640 | 575 |
| M (300/500%) | 4.7/9.7 | 7.0/12.5 | 8.7/13.4 |
| H 23° | 67 | 72 | 76 |
| H 70° | 54 | 59 | 63 |
| H 100° | 38 | 42 | 42 |
| H 120° | 20 | 26 | 26 |
| H 150° | 4 | 7 | 9 |
| E 23/70 | 66/60 | 64/57 | 64/55 |
| Str. | 220 | 250 | 330 |

This example shows that less hard mixtures can also be obtained with excellent mechanical properties without the addition of plasticizer oils.

EXAMPLE 12

In 1.300 ml of dry toluene 2 ml of tetrahydrofurane, 182 g of butadiene and 70 g of styrene were dissolved simultaneously. The mixture was activated with 2.6 mMols of butyllithium and polymerised for 3 hours at 55° C. Subsequently, 2.0 mMols of carbonic acid diethylester were added and reacted for 30 min. at 20° C. The polymer solution obtained was stabilised with 0.5 parts by weight of a phenolic antioxidant per 100 parts of polymer and 35.7 g of tetramethyl-bisphenol-A-polycarbonate (MPC, $\eta$rel.=1.30) were added in the form of a 20% by weight solution in toluene. The polymers were precipitated from the mixture with ethanol and dried in a vacuum at 70° C. Test plates were made from the polymer mixture obtained. The result was as follows:

| F | D | M(300/500%) | H 23° |
| --- | --- | --- | --- |
| 2.4 | 400 | 1.4/— | 65 |

This table shows that the mixture of a statistical butadiene/styrene copolymer with a tetramethyl-bisphenol-A-polycarbonate does not yield a product of sufficient strength.

EXAMPLE 13

The styrene butadiene polymer (S/B) of Example 8 was mixed with bisphenol-A-polycarbonate (PC), tetramethyl-bisphenol-A-polycarbonate of Example 12 (MPC) and polystyrene (PS, Polystyrene 165 H, BASF) as indicated in the table below. The mixtures were processed by steam distillation and the mechanical properties determined.

| Ex. | Parts by weight S/B | PC | MPC | PS | F | D | M | H(23,70,100,150°) | | | | Str.F(80° C.) | |
|-----|-----|----|-----|----|------|-----|----------|----|----|----|----|-----|-----|
| A | 100 | — | 20 | — | 19.7 | 545 | 12.0/17.9 | 97 | 96 | 93 | 17 | 535 | 9.7 |
| B | 100 | 5 | 15 | — | 17.2 | 610 | 7.4/10.4 | 95 | 95 | 81 | 6 | 320 | |
| C | 100 | 10 | 10 | — | 14.1 | 640 | 6.8/10.4 | 96 | 94 | 75 | 6 | 315 | |
| D | 100 | — | — | 20 | 14.2 | 555 | 4.9/9.6 | 94 | 92 | 38 | 0 | 220 | 1.2 |

The mechanical data found clearly demonstrate improved properties for all the polycarbonate mixtures, as compared to the polystyrene mixtures.

EXAMPLE 14

This example describes mixtures with low Shore Hardness. A styrene butadiene polymer of molecular weight 20.000/40.000 is made and linked according to Example 3 with ethylcarbonate. To the polymer mixture there are added 33 parts by weight per 100 parts by weight of polymer of a rubber-extending oil and 33 parts by weight per 100 parts of polymer of tetramethyl-bisphenol-A-polycarbonate (as used in Example 12). The mixture was processed by steam distillation and the mechanical properties of the blend were determined. The following table shows the results as compared to a commercial styrene butadiene block copolymer of abt. the same hardness (Cariflex TR 4122 of Shell AG).

| | F | D | M | H(23,70,100,150°) | | | | Str. |
|---|-----|-----|--------|----|----|----|----|-----|
| Example | 14.0 | 715 | 4.1/8.6 | 63 | 58 | 50 | 13 | 105 |
| Cariflex | 7.4 | 980 | 2.4/3.6 | 74 | 46 | 5 | 0 | 88 |

EXAMPLE 15

100 Parts by weight of a hydrogenated block styrene butadiene copolymer (Kraton G ®1650 Shell AG) were mixed (a) with 20 parts by weight and (b) with 30 parts by weight of a tetramethyl-bisphenol-A-polycarbonate (MPC ηrel.=1.30) in the form of solutions of toluene. 0.5 parts by weight per 100 parts of the copolymer of ditertiary butylmethylphenol were added as a stabiliser and the polymers precipitated with ethanol. The mixture was dried in a vacuum at 70° C. and an elastic material was obtained the mechanical data of which are indicated in the table below.

The same data for the pure hydrogenated styrene butadiene copolymer are also indicated for comparison.

Obviously, the moduli are improved as well as heat distortion (as evident from the increase in Shore A-Hardness and of strength) and also tear propagation resistance is improved.

| Example | F | D | M(300/500%) | H(23,70,100,120,150° C.) | | | | |
|---------|------|-----|------|----|----|----|----|----|
| A | 14.0 | 315 | 13.1 | — | 83 | 78 | 68 | 55 | 29 |
| B | 17.4 | 185 | — | | 87 | 83 | 75 | 65 | 34 |
| Kraton G 1650 | 16.7 | 555 | 3.5 | 10.7 | 78 | 67 | 39 | 27 | 23 |

| Example | E(23/70° C.) | Str | F(80° C.) | D(80° C.) |
|---------|--------------|-----|-----------|-----------|
| A | 54/58 | 130 | 6.2 | 345 |
| B | 57/54 | 165 | 7.2 | 320 |
| Kraton G 1650 | 57/60 | 97 | 2.5 | 425 |

EXAMPLE 16

Example 15 was repeated, but a different styrene butadiene copolymer (Kraton G 1652 ® of Shell AG) was used. The result is shown in the table below.

| Example | F | D | M(300/500%) | | H(23,70,100,120,150° C.) | | | | |
|---------|------|-----|-----|------|----|----|----|----|----|
| A | 15,0 | 280 | — | — | 83 | 78 | 62 | 45 | 19 |
| B | 20,4 | 280 | — | — | 84 | 82 | 66 | 53 | 29 |
| Kraton G 1652 | 20,0 | 530 | 4,8 | 17,4 | 78 | 67 | 31 | 22 | 10 |

| Example | E(23/70° C.) | Str. | F(80° C.) | D(80° C.) |
|---------|--------------|------|-----------|-----------|
| A | 58/63 | 110 | 4,1 | 225 |
| B | 57/61 | 150 | 5,6 | 205 |
| Kraton G 1652 | 63/61 | 88 | 1,6 | 250 |

EXAMPLE 17

From 100 parts Solprene 406 (a styrene/butadiene block-copolymer of the Phillips radial type containing 40% of styrene) and 20 parts each of the polycarbonate of tetramethyl-bis-phenol A (MPC, ηrel.=1.28) and 20 parts polystyrene 165 H (BASF), two 20% toluene solutions were prepared. After precipitation with ethanol, processing was done as usual. The results obtained from determination of the mechanical properties are listed below. The results obtained from the undiluted Solprene 406 are shown in line A.

| Example | Solprene 406 | MPC | Polystyrene 165 H | F | D | M 300/500 | H23/70/100/120/150° | | | | |
|---------|---------|-----|---------|------|-----|----------|----|----|----|----|----|
| A | 100 | — | — | 12.7 | 655 | 3.2/6.2 | 92 | 76 | 32 | 27 | 7 |
| B | 100 | 20 | — | 20.8 | 440 | 12.8/— | 97 | 96 | 90 | 66 | 17 |
| C | 100 | — | 20 | 14.8 | 520 | 8.1/14.1 | 95 | 91 | 52 | 29 | 8 |

| | E 23/70° | Str. | H(Shore D) 23/70° |
|---|----------|------|-------------------|
| A | 41/35 | 110 | — |
| B | 41/35 | 305 | 45/35 |

| | | -continued | |
|---|---|---|---|
| C | 39/33 | 235 | 41/33 |

EXAMPLE 18

In a toluene solution, a living polystyrene (kinetic mol-weight 15,000) from styrene and butyllithium is prepared. To this solution a mixture of toluene, butadiene and divinylbenzene is added. The amount of butadiene is measured in such a way that a kinetic mol-weight of 40,000 is calculated. The molar proportion of divinylbenzene to lithiumalkyl was 5. After 3 hours the reaction was stopped by adding a few drops of methanol, the solution stabilized with ditertiary butylmethylphenol and one half of the solution (A) mixed with a solution of 20 parts MPC in toluene per 100 parts each of the segment polymer; the other half (B) remained unchanged. Processing was carried out by precipitation with ethyl alcohol. After production of test samples at 170° C., the mechanical properties were determined as follows:

| Example | F | D | M 300/500% | H Shore A 23/70/100/120/150° | E 23/70° | Str. | Shore D 23/70° | | |
|---|---|---|---|---|---|---|---|---|---|
| A | 17.3 | 600 | 7.6/14.6 | 74 68 59 49 24 | 59/56 | 120 | 25 | 16 | |
| B | 12.4 | 1010 | 1.9/2.9 | 61 50 23 12 — | 64/56 | 80 | 15 | 7 | |

EXAMPLE 19

Using toluene as a solvent, living styrene/butadiene diblock-polymers were produced (S-B-Li). The calculated mol-weights of the two blocks are shown in the table below. Thereafter, divinylbenzene in a molar proportion, related to the amount of butyllithium used, as indicated, was added. After 3 hours, reaction was stopped by adding some methanol, the solution stabilized with a phenolic antioxidants and, if necessary, added the amount of MPC (rel.$\eta$=1.28) as indicated in the table below.

| | MG · 10$^{-3}$ | | DVB | MPC | | | M | Hardness |
|---|---|---|---|---|---|---|---|---|
| Example | Sty | Bd | Li | phr | F | D | 300/500 | 23/70/100/120/150° |
| A | 15 | 20 | 3.0 | — | 5.8 | 600 | 3.5/5.1 | 84 70 17 3 — |
| B | 15 | 20 | 3.0 | 20 | 12.3 | 625 | 8.8/11.7 | 96 86 46 27 5 |
| C | 20 | 40 | 6.0 | — | 8.7 | 645 | 2.6/4.4 | 85 70 41 26 13 |
| D | 20 | 40 | 6.0 | 20 | 15.7 | 480 | 9.0/— | 90 86 71 60 32 |

| Example | E 23/70° | Str. | Shore D 23/70° |
|---|---|---|---|
| A | 41/36 | 145 | 30/12 |
| B | 45/38 | 225 | 40/26 |
| C | 47/40 | 130 | 27/18 |
| D | 49/47 | 180 | 40/31 |

EXAMPLE 20

Analogous to Example 19, polymers containing isoprene instead of butadiene were produced.

| | MG · 10$^{-3}$ | | DVB | MPC | | | M | Hardness |
|---|---|---|---|---|---|---|---|---|
| Example | Sty | IPN | Li | phr | F | D | 300/500 | 23/70/100/120/150° |
| A | 20 | 40 | 6.0 | — | 19.6 | 960 | 2.2/3.6 | 68/58/ 28/ 13/ 5 |
| B | 20 | 40 | 6.0 | 20 | 16.3 | 760 | 6.0/11.0 | 71/65/ 55/ 44/ 16 |

| Example | E 23/70° | Str. | Shore D 23/70° |
|---|---|---|---|
| A | 51/55 | 110 | 17/10 |
| B | 51/59 | 115 | 22/16 |

EXAMPLE 21

Here, the influence of the processing on the product properties is shown. A solution in toluene according to the mixture of Example 8 B was not precipitated, but steam distilled. From determination of the Shore A hardness, the following values resulted:

| | 23° | 70° | 100° | 120° | 150° |
|---|---|---|---|---|---|
| Example 21 | 96 | 96 | 94 | 72 | 25 |
| Example 8 B | 94 | 94 | 69 | 41 | 15 |

We claim:

1. A mixture comprising:
(a) 99 to 1% by weight of one or more segment copolymers including partly or totally hydrogenated segment polymers of alternating linear or branched segments A and B wherein A comprises a hard segment polymeric block of aromatic vinyl compounds and B comprises a soft segment polymeric block containing polymerised conjugated dienes, said hard segment having Tg higher than 20° C. and said soft segment having Tg lower than 0° C., and
(b) 1 to 99% by weight of one or more aromatic polycarbonates in which the linear chains comprise at least 50% of structural units of the general formula

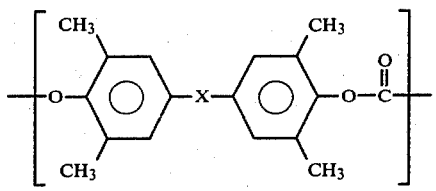 (I)

wherein X is $C_1$–$C_5$ alkylene or alkylidene.

2. A mixture as claimed in claim 1 wherein the aromatic polycarbonate consists entirely of structural units of the general formula (I).

3. A mixture as claimed in claim 1 wherein the aromatic polycarbonate has a molecular weight average of from 15,000 to 60,000.

4. A mixture as claimed in claim 1 wherein the segment copolymer comprises hard segments having a molecular weight of between 10,000 and 50,000 and soft segments having a molecular weight between 20,000 and 80,000.

5. A mixture as claimed in claim 1 which also comprises an oil.

6. A mixture as claimed in claim 1, comprising 90 to 65% by weight of the segment copolymer and 10 to 35% by weight of the aromatic polycarbonate.

7. A mixture as claimed in claim 6 wherein the segment copolymer contains from 20 to 50% by weight of hard segments and from 80 to 50% by weight of soft segments.

8. A mixture as claimed in claim 1, comprising from 15 to 80% by weight of the segment copolymer and from 85 to 20% by weight of the aromatic polycarbonate.

9. A mixture as claimed in claim 8, wherein the segment copolymer contains from 30 to 80% by weight of hard segments and from 70 to 20% by weight of soft segments.

* * * * *